A. NEUMANN.
KETTLE LEG.
APPLICATION FILED APR. 4, 1913.
1,165,116.
Patented Dec. 21, 1915.
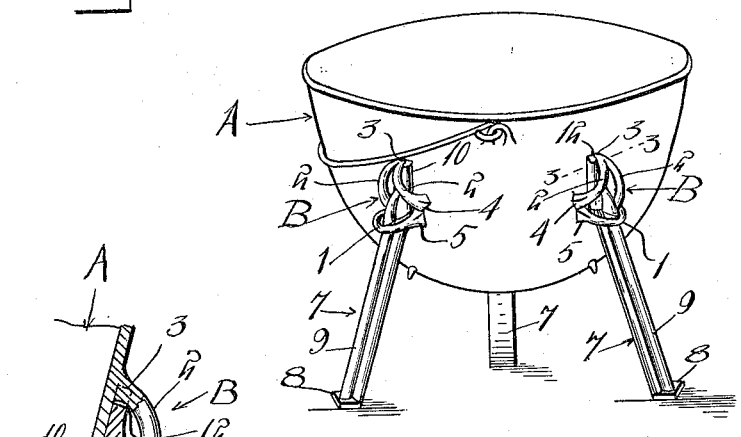
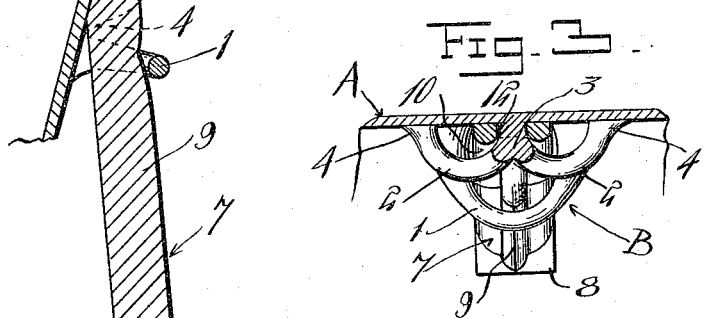
Witnesses
Inventor
A. Neumann.
By
Attorneys

UNITED STATES PATENT OFFICE.

ALEXANDER NEUMANN, OF RIDGWAY, ILLINOIS.

KETTLE-LEG.

1,165,116.  Specification of Letters Patent.  Patented Dec. 21, 1915.

Application filed April 4, 1913. Serial No. 758,900.

*To all whom it may concern:*

Be it known that I, ALEXANDER NEUMANN, a citizen of the United States, residing at Ridgway, in the county of Gallatin, State of Illinois, have invented certain new and useful Improvements in Kettle-Legs; and I do hereby declare the following to be a full, clear, and exact description of the invention, such as will enable others skilled in the art to which it appertains to make and use the same.

This invention relates to certain novel and useful improvements in supports for kettles and similar vessels.

In carrying out my invention it is my purpose to provide the kettle or other vessel with brackets which are designed to detachably receive supporting legs or standards of peculiar construction so that when the parts are arranged in operative position the kettle will be positively and firmly supported. At the same time the construction of the elements forming my kettle support are such that they may be readily disassembled or dismantled when it is not desired to use the kettle.

Still a further object of my invention is to provide kettle supporting means which will embody the desired features of simplicity, reliability and convenience.

With the above recited objects and others of a similar nature in view, my invention consists in the construction, combination and arrangement of parts set forth in and falling within the scope of the appended claim.

In the accompanying drawings: Figure 1 is a perspective view of a kettle provided with my invention. Fig. 2 is a vertical longitudinal sectional view taken through one of the kettle legs and the bracket therefor. Fig. 3 is a cross sectional view taken through the bracket and leg on the line 3—3 of Fig. 1.

Referring now to the accompanying drawings in detail, the letter A indicates conventionally a kettle supported by means of my improvement. This kettle has attached to its outer wall at suitable points, a series of brackets, preferably three in number, each bracket being indicated as an entirety by the letter B. As will be noted, each of the brackets comprises a lower horizontally projecting ear or loop 1 and a pair of vertically inclined ears or loops 2 arranged above the horizontal ear, these loops 2 meeting at their upper terminals as at 3, and then extending or diverging downward and outward, so that their lower terminals 4 are located directly above the ends 5 of the horizontal ears or lugs 6. Each of these brackets is designed to receive the upper end of the leg 7, the lower end of said leg being provided with a foot or floor plate 8. Each leg is provided with a longitudinally extending bead 9 so that such leg is approximately three sided in cross section. The upper end 10 of each of said legs projects vertically at an angle to the inclined or main body portion of the leg so that when the legs are in supporting position the upper angular end 10 thereof will bear against the side of the kettle. The bead or rib 9 of each leg terminates short of the upper end of such leg and such upper end is recessed or slotted as at 12 to form a fork which is designed to receive the upper contacting ends of the lug or loop 2 of the bracket when the leg is placed in supporting position as will be clearly seen by reference to Fig. 1. In practice these legs may be formed of any suitable material, preferably metal, and may be cast in one piece or formed in sections if desired.

It will be seen that in arranging my support for operation, it is only necessary to insert the upper end of each leg within its bracket so that the slot or fork end thereof will engage beneath the upper ends of the lugs or loops 2, while the loop 1 will bear upon the central bead or rib 9 at the meeting angle of the vertical and inclined sections of the leg. Thus when the feet of the legs are resting on the floor the major portion of such legs will extend at an angle with the upper vertical sections thereof lying in contact with the sides of the kettle and the latter will be firmly and rigidly supported.

It will be noted that I have provided an exceedingly simple, yet efficient means for supporting kettles, pots and other utensils, and furthermore, that by my arrangement the utensil may be readily mounted on or dismounted from its supports.

What I claim is:

Receptacle supporting means comprising a series of brackets adapted to be secured to the outer wall of a receptacle, each of said brackets comprising two vertically inclined loop-shaped side members and a bottom member, the three members of each bracket being arranged in the form of a triangle, and a leg for each bracket having an angular upper end portion slotted at its top edge to receive the apex of the bracket, the bottom member of the bracket bearing against the outer face of the leg at a point below the slotted end thereof.

In testimony whereof, I affix my signature, in the presence of two witnesses.

ALEXANDER NEUMANN.

Witnesses:
WM. MITSDARFFER,
JOHN M. BEER.

Copies of this patent may be obtained for five cents each, by addressing the "Commissioner of Patents, Washington, D. C."